United States Patent [19]

Cuscurida et al.

[11] Patent Number: 5,093,455
[45] Date of Patent: Mar. 3, 1992

[54] N,N-DIALKYLENEDIAMINES AS CURING AGENTS FOR BLOCKED ISOCYANATE COATINGS

[75] Inventors: Michael Cuscurida; George P. Speranza; Wei-Yang Su, all of Austin, Tex.

[73] Assignee: Texaco Chemical Company, White Plains, N.Y.

[21] Appl. No.: 382,601

[22] Filed: Jul. 21, 1989

[51] Int. Cl.$^5$ .................. C08G 18/32; C08G 18/80
[52] U.S. Cl. .................................................. 528/45
[58] Field of Search ......................................... 528/45

[56] References Cited

U.S. PATENT DOCUMENTS

| 4,767,836 | 8/1988 | Cuscurida et al. | 528/45 |
| 4,777,225 | 10/1988 | Paar | 524/901 |
| 4,904,751 | 2/1990 | Speranza et al. | 528/45 |

Primary Examiner—John Kight, III
Assistant Examiner—Rabon Sergent
Attorney, Agent, or Firm—Jack H. Park; Kenneth R. Priem; Cynthia L. Kendrick

[57] ABSTRACT

Disclosed is a coating composition with improved stability which comprises an isocyanate which has been chemically blocked and a curing agent comprising an N,N'-dialkylalkylenediamine.

7 Claims, No Drawings

N,N-DIALKYLENEDIAMINES AS CURING AGENTS FOR BLOCKED ISOCYANATE COATINGS

BACKGROUND OF THE INVENTION

1. Field of the Invention

This invention relates to curing agents for coatings. More particularly this invention relates to the use of certain N,N'-dialkylalkylenediamines as curing agents for blocked isocyanate coatings. The coatings formulated with the products of this invention have better storage stability than those which utilize other curing agents. In addition, heat cured films made from these coatings have good properties.

2. Related Art

It is known in the art to combine various compounds with isocyanates to provide coating compositions with a variety of desirable properties.

A non-aqueous poly(urethane-urea) is disclosed in U.S. Pat. No. 4,590,254. It is prepared by reverse-addition of an isocyanate-terminated prepolymer to an organic medium containing an alcohol solvent and a chain extender comprising at least two isocyanate-reactive active hydrogen groups.

In U.S. Pat. No. 4,490,520 there is disclosed a process for preparation of an impact-resistant polyamide which comprises polymerizing an ω-lactam in contact with (1) an alkalai catalyst and (2) the reaction product of (a) a polyfunctional cocatalyst and a polyoxyalkyleneamine. The polyamides of this process are particularly useful for making strong tough molded or cast articles.

Wolf et al. disclose in U.S. Pat. No. 4,495,229 a polyurethane one-component heat-cured coating which is stable in storage, may be hardened above 120° C. and is made of a polyol compound having a low glass transition temperature and a blocked polyisocyanate, where the blocked isocyanate is the reaction product of a polyisocyanate compound and a secondary amine.

Novel difunctional isocyanate prepolymers have been synthesized from polyoxyalkylenediamines and diisocyanates, as exemplified in U.S. Pat. No. 4,761,465. The novel products contain two active isocyanate groups linked by at least two urea and polyoxyalkylene moieties.

It is known that some agents reduce side reactions in isocyanates during storage. In U.S. Pat. No. 4,590,009 there is disclosed a method of reducing side reactions during the preparation and storage of a compound having a free isocyanate group by the addition of 50 to 5000 ppm hydrazine hydrate based on the amine reacted with the polyisocyanate group.

A very good overview of blocked isocyanates can be found in a Mobay publication titled "Blocked Isocyanates in Coatings", Mobay Chemical Corp., presented at Water-Borne and Higher-Solids Conference, Feb. 5-7, 1986, New Orleans, La. Many aspects of isocyanate chemistry are discussed including background, properties, raw materials, advantages of blocked polyisocyanates, blocking agents, etc.

A partially alkoxylated polyoxyalkyleneamine has been used as a curing agent. In U.S. Pat. No. 4,767,836 a storage stable polyurethane coating composition is disclosed which may be heat cured under relatively mild conditions. It comprises an isocyanate which has been chemically blocked and a curing agent comprising a partially alkoxylated polyoxyalkylene amine.

In a U. K. Patent to USM Corporation (U. K. 2,151,643) there is disclosed a heat curable composition comprising (a) polyurethane prepolymer formed by reacting a polyisocyanate with a polyol, (b) a blocking agent and (c) a curing agent comprising an amine tipped polyoxypropylene polyether triol.

A one pot or package polyurethane system having the advantage of easy handling is disclosed in U.S. Pat. No. 4,624,996. The system comprises an isocyanate-terminated polyurethane prepolymer the isocyanate groups of which are blocked by reaction with an oxime, and a curing agent having at least two active hydrogen atoms per molecule.

In related copending case U.S. application Ser. No. 078,309 a series of novel diamines was prepared from the reaction of polyoxyalkylenediamines and diisocyanates.

Much information is available on the properties of various amines in a product booklet titled, "Amines", Virginia Chemical Company, Portsmouth, Va.

It is always useful in the art to identify compounds useful as curing agents for coatings, especially those which will provide products with improved storage stability.

It is known that N,N'-di-tert-butylethylenediamine can be used as an epoxy hardener. Technical Data, Bulletin 1100.95, Virginia Chemical Company. However, in the instant invention it was found that said amine is not suitable for use as a curing agent for blocked isocyanates. Now it has surprisingly been discovered that certain N,N'-dialkylalkylenediamines having a definable structure are useful curatives for blocked isocyanates. N,N'-diisopropylethylenediamine and N,N'-diisobutylethylene-diamine are among the definable alkylenediamines which provide cured blocked isocyanate products that are more stable than products resulting from blocked isocyanates cured with other amines.

SUMMARY OF THE INVENTION

A coating composition with improved stability which comprises an isocyanate which has been chemically blocked and a curing agent comprising an N,N'-dialkylalkylenediamine is described.

DETAILED DESCRIPTION OF THE PREFERRED EMBODIMENT

The N,N'-dialkylalkylenediamine used as the curing agent of a uncured blocked isocyanate is a member of a group of N,N'-dialkylalkylenediamines having the following general formula:

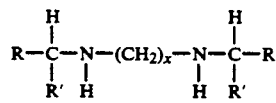

where x=2-6 and R and R' are alkyl groups.

In the instant invention it has been discovered that particular N,N'-dialkylalkylenediamines having the structure identified above have properties which make them particularly valuable as curing agents. N,N'-diisopropylethylenediamine and N,N'-diisobutylethylenediamine are especially preferred for this application.

When a N,N'-dialkylalkylenediamine is combined with a blocked isocyanate it results in a coating composition having the following desirable properties:
1. Improved storage stability.
2. Improved properties of heat cured films made from the coatings. (Formulations, film properties and storage stability data are shown in Tables I and II.)

Products possessing such desirable properties are useful in a number of applications, such as heat-cured isocyanate coatings. Blocked isocyanates are used where one-component systems are required, the presence of free isocyanate must be excluded and heat curing is possible. Specific application would include powder coatings, magnet wire coatings and appliance coatings.

A blocked isocyanate coating which may be cured by the process of this invention may typically be an isocyanate-terminated prepolymer based on polyester or polyether polyols and aromatic or aliphatic diisocyanates. Isocyanate-terminated prepolymers that have been blocked with phenol, cresols, nonylphenol, caprolactam, oximes, malonates, acetoacetates and sodium bisulfite are suitable blocked isocyanates for use in the instant invention.

Isocyanate-terminated prepolymers used in the examples include Mondur CB-601 PMA, an isocyanate-terminated prepolymer supplied by Mobay Chemical Co. which contains 10-11% free isocyanate, which has been blocked with methyl ether ketone oxime.

Typically, in preparation of the blocked isocyanates, an isocyanate prepolymer is charged to a four-necked flask, the blocking agent is added dropwise and the temperature elevated moderately for a period of time from about 30 minutes to two hours. Subsequently, the material was diluted with a solvent such as ethylene glycol monoethyl ether acetate.

The novel curative should be present in the blocked isocyanate in an amount sufficient to react on a stoichiometric basis with available isocyanate of the blocked isocyanate.

The curing should take place at moderately elevated temperatures. Temperatures from 50° C. to 150° C. may be used. The preferred temperature range is from 100° to 125° C.

In the examples curing took place over a period of 0.5 to 4 hours. Optimum physical properties developed using cure times of 0.5 to 1.0 hours and moderately elevated temperatures.

Practice of the novel method of this invention is apparent from the procedures exemplified in Examples 1 and 2. The method of curing blocked isocyanates with the N,N'-dialkylalkylenediamines herein described allows for the production of compositions with improved properties over those in the art where other curing agents are utilized.

The examples are intended only as a means of illustration and are not to be construed as limitative.

EXAMPLE I

This example will illustrate the preparation of a methyl ethyl ketone oxime-blocked isocyanate prepolymer.

A two liter four-necked flask equipped with a stirrer, thermometer, water condenser, dropping funnel and nitrogen source was charged with 1000g Mondur CB-601 PMA (an isocyanate-terminated prepolymer supplied by Mobay Chemical Co.) which contained 10-11% free isocyanate. Methyl ethyl ketone oxime (222.2 g) was then added dropwise over a 1.1 hour period. The temperature rose to a maximum of 68° C. during that period. After a one-hour digestion period the material was diluted with 135.9 g ethylene glycol monoethyl ether acetate. Basis available isocyanate, the product had an equivalent weight of 543.6.

EXAMPLE 2

This example demonstrates the use of N,N'-diisopropylethylenediamine as a curing agent for blocked isocyanate coatings. It also shows the improved storage stability and properties of heat cured films made using this curing agent as compared to those made from JEFFAMINE ® EDR-148 and EDR-192 amines (triethyleneglycol diamines and tetraethyleneglycol diamines).

Formulations, film properties and storage stability data are shown in Table 1.

TABLE 1

| | Coating no. | | |
|---|---|---|---|
| | 6445-28A | 6445-68A | 6276-68B |
| Formulation, pbw | | | |
| Blocked isocyanate of Example 1 (ew≈543.6) | 88 | 75 | 75 |
| N,N'-diisopropylethylenediamine[a] | 12 | — | — |
| JEFFAMINE ® EDR-148[b] | — | 10.2 | — |
| JEFFAMINE ® EDR-192[c] | — | — | 13.25 |
| Ethylene glycol monoethyl ether acetate | 5 | — | — |
| Film preparation | | | |
| Wet film thickness, mil 5 | 5 | 5 | — |
| Cure temperature, °C. | 103 | 100–105 | 100–105 |
| Cure time, hr. | 0.5 | 0.5 | 0.5 |
| Film properties | | | |
| Pencil hardness | F-H | Opaque film many bubbles | Opaque film many bubbles |
| Impact resistance, in/lb | | | |
| Forward | 10–15 | — | — |
| Reverse | 5 | — | — |
| Appearance | Bubble free | — | — |
| Storage stability | | | |
| Viscosity, 77° F. (days) | 1260 (1) 6500 (19) | 3550 (1) 32500 (5) Note 1 | 3050 (1) 22750 (5) Note 2 |
| Appearance after three days at 50° C. | Fluid 2 days | Gelled 3–4 days | Gelled within 3–4 hrs. |

Note 1: Phase separated and gelled after 7 days.
Note 2: Phase separated and gelled after 7 days.
[a]Lab 6386-10-23
[b]Triethyleneglycol diamines
[c]Tetraethyleneglycol diamines

EXAMPLE 3

This example shows the use of N,N'-diisobutylethylenediamine as a curing agent for the blocked isocyanate coating described in Example 1. It will further show the improved properties of heat cured films made from this material as compared to those made from JEFFAMINE ® D-400 amine.

Formulations, film properties, and storage stability are shown in Table 2.

TABLE 2

| | Coating no. | |
|---|---|---|
| | 6445-32A | 6173-49D |
| Formulation, pbw | | |
| Blocked isocyanate of | 86.3 | 106.5 |

TABLE 2-continued

|  | Coating no. | |
|---|---|---|
|  | 6445-32A | 6173-49D |
| Example 1 (e.w. 534.6) | | |
| N,N'-diisobutylethylene-diamine | 13.7 | — |
| JEFFAMINE ® D-400 | — | 40.8 |
| Ethylene glycol monoethyl ether acetate | 5 | — |
| Film preparation | | |
| Wet film thickness, mil | 5 | 5 |
| Cure temperature, °C. | 105 | 100–105 |
| Cure time, hr. | 0.5 | 0.5 |
| Film properties | | |
| Pencil hardness | F-H | H |
| Impact resistance, in/lb | | |
| Forward | 5 | Pass 160 |
| Reverse | 5 | Pass 160 |
| Storage stability, 50° C. | Fluid after 3 days | Gelled within four hours |

*6380-19-11

EXAMPLE 4

Example 4 shows that N,N'-di-tertiary butyl ethylene diamine is not a suitable curing agent for blocked isocyanate coatings.

The formulation, details of preparation and results are shown as follows:

|  | Sample no. 6445-31A |
|---|---|
| Formulation, pbw | |
| Blocked isocyanate of Example 1 (e.w. ≈ 543-6) | 86.3 |
| N,N'-di-tertiary butyl-ethylenediamine$^c$ | 13.7 |
| Ethylene glycol monoethyl ether acetate | 5.0 |
| Film preparation | |
| Wet film thickness, mil | 5 |
| Cure temperature, °C. | 103 |
| Time, hr. | 4 |
| Properties | |
| Appearance | Tacky after four hours |
|  | Sample no. 6445-31A |
|  | at 103° C. |

$^c$Virginia Chemical Co.

In addition, a five mil film was cured 6 hours at 103° C. The resultant film was discolored (yellowed) and fractured on cooling.

What is claimed is:

1. A storage stable, heat curable blocked isocyanate coating composition comprising a blocked isocyanate and an effective curing amount of an N,N'-dialkylalkylenediamine of the general formula:

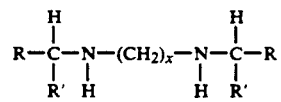

where $x=2-6$ and R and R' are alkyl groups.

2. A coating composition as in claim 1 wherein the blocked isocyanate is an isocyanate-terminated prepolymer based on a polyol from the group consisting of polyester polyols, polyether polyols, or polyhydric alcohols.

3. A coating composition as in claim 2 wherein the blocked isocyanate is derived from an isocyanate-terminated prepolymer based on a diisocyanate from the group consisting of aromatic diisocyanates or aliphatic diisocyanates.

4. The blocked isocyanate-terminated prepolymers of claim 1 wherein the blocking agent is selected from the group consisting of phenols, cresols, nonylphenol, ω-caprolactam, oximes, malonates, acetoacetates and sodium bisulfite.

5. A coating composition as in claim 1 wherein the N,N'-dialkylalkylenediamine is present in an amount sufficient to react on a stoichiometric basis with the available isocyanate of the blocked isocyanate coating.

6. The coating composition of claim 1 wherein the N,N'-dialkylalkylenediamine is N,N'-diisopropylethylenediamine.

7. The coating composition of claim 1 wherein the N,N'-dialkylalkylenediamine is N,N'-diisobutylethylenediamine.

* * * * *